United States Patent
Yoshida

(10) Patent No.: US 9,704,614 B2
(45) Date of Patent: Jul. 11, 2017

(54) ROOM TEMPERATURE-CURABLE ELECTRICALLY CONDUCTIVE FLUOROSILICONE RUBBER COMPOSITION

(71) Applicant: DOW CORNING TORAY CO., LTD., Chiyoda-Ku (JP)

(72) Inventor: Hiroaki Yoshida, Ichihara (JP)

(73) Assignee: DOW CORNING TORAY CO., LTD., Tokyo (JP)

(*) Notice: Subject to any disclaimer, the term of this patent is extended or adjusted under 35 U.S.C. 154(b) by 241 days.

(21) Appl. No.: 14/403,589

(22) PCT Filed: May 24, 2013

(86) PCT No.: PCT/JP2013/065128
§ 371 (c)(1),
(2) Date: Nov. 25, 2014

(87) PCT Pub. No.: WO2013/180254
PCT Pub. Date: Dec. 5, 2013

(65) Prior Publication Data
US 2015/0123044 A1 May 7, 2015

(30) Foreign Application Priority Data
May 29, 2012 (JP) ................................ 2012-121857

(51) Int. Cl.
| | | |
|---|---|---|
| H01B 1/24 | (2006.01) |
| C08G 77/04 | (2006.01) |
| C08G 77/16 | (2006.01) |
| C08K 3/04 | (2006.01) |
| C08K 3/36 | (2006.01) |
| C08K 5/5419 | (2006.01) |
| C08K 5/5465 | (2006.01) |
| C08G 77/24 | (2006.01) |

(52) U.S. Cl.
CPC ............... *H01B 1/24* (2013.01); *C08G 77/16* (2013.01); *C08K 3/04* (2013.01); *C08K 3/36* (2013.01); *C08K 5/5419* (2013.01); *C08K 5/5465* (2013.01); *C08G 77/24* (2013.01); *C08K 2201/011* (2013.01)

(58) Field of Classification Search
CPC ............... H01B 1/02; H01B 1/22; H01B 1/24
USPC .................... 252/500–511, 519.31
See application file for complete search history.

(56) References Cited

U.S. PATENT DOCUMENTS

| | | | | |
|---|---|---|---|---|
| 3,968,055 A * | 7/1976 | Palmer | ............... | C09J 183/04 |
| | | | | 252/506 |
| 4,672,003 A * | 6/1987 | Letoffe | ............... | C08L 83/04 |
| | | | | 428/447 |
| 4,882,369 A | 11/1989 | Maxson | | |
| 5,354,833 A | 10/1994 | Dziark | | |
| 5,420,675 A | 5/1995 | Thompson et al. | | |
| 6,173,147 B1 | 1/2001 | Nakashima et al. | | |
| 6,268,426 B1 | 7/2001 | Hirabayashi et al. | | |
| 6,479,610 B1 | 11/2002 | Singh et al. | | |
| 6,946,513 B2* | 9/2005 | Higashino | ............. | C08F 214/18 |
| | | | | 257/E23.119 |
| 7,585,434 B2 | 9/2009 | Morita et al. | | |
| 2007/0244287 A1* | 10/2007 | Hatanaka | ............. | C08K 5/0025 |
| | | | | 528/15 |
| 2007/0267603 A1 | 11/2007 | Takagi et al. | | |
| 2010/0096181 A1 | 4/2010 | Nakamura et al. | | |
| 2010/0098892 A1 | 4/2010 | Hayashida et al. | | |
| 2010/0308279 A1* | 12/2010 | Zhou | ..................... | B82Y 30/00 |
| | | | | 252/511 |

FOREIGN PATENT DOCUMENTS

| | | |
|---|---|---|
| CN | 101724274 A | 6/2010 |
| CN | 101942200 A | 1/2011 |
| EP | 1176173 A2 | 1/2002 |
| EP | 1246871 B1 | 1/2008 |

(Continued)

OTHER PUBLICATIONS

English language abstract and machine-assisted English translation for JP2007-169356 A extracted from http://worldwide.espacenet.com on Apr. 12, 2016,16 pages.

(Continued)

*Primary Examiner* — Tri V Nguyen
(74) *Attorney, Agent, or Firm* — Warner Norcross & Judd LLP

(57) ABSTRACT

A room temperature-curable electrically conductive fluorosilicone rubber composition comprises: (A) a fluoropolysiloxane capped at the molecular terminals with hydroxyl groups having a viscosity at 25° C. of from 1,000 to 1,000,000 mPa·s; (B) fine silica powder having a BET specific surface area of not less than 50 m$^2$/g; (C) a carbon black; (D) a fibrous carbon allotrope having a graphene structure; and (E) a crosslinking agent. Component (D) is comprised in an amount of not less than 1.5 parts by mass per 100 parts by mass of component (A). The room temperature-curable electrically conductive fluorosilicone rubber composition is cured to form a cured product having both superior post-cure physical strength and electrical conductivity. Also, the room temperature-curable electrically conductive fluorosilicone rubber composition has viscosity that enables superior handling, and provides superior post-cure surface smoothness, solvent resistance, and adhesion.

20 Claims, No Drawings

(56) References Cited

FOREIGN PATENT DOCUMENTS

| JP | H02-43264 A | 2/1990 |
|----|----|----|
| JP | H0243264 A | 2/1990 |
| JP | H06262621 A | 9/1994 |
| JP | H07295403 A | 11/1995 |
| JP | H11167295 A | 6/1999 |
| JP | 2000-273307 A | 10/2000 |
| JP | 2004505134 A | 2/2004 |
| JP | 2004221071 A | 8/2004 |
| JP | 2007-169356 A | 7/2007 |
| JP | 2007169356 A | 7/2007 |
| JP | 2009-508999 A | 3/2009 |
| WO | WO2006064783 A1 | 6/2006 |
| WO | WO2008126690 A1 | 10/2008 |

OTHER PUBLICATIONS

PCT/JP2013/065128 International Search Report dated Dec. 18, 2013, 3 pages.
English language abstract for JPH0243264 extracted from espacenet.com database on Oct. 15, 2014, 2 pages.
English language abstract for JPH06262621 extracted from espacenet.com database on Oct. 15, 2014, 1 page.
English language abstract for JPH07295403 extracted from espacenet.com database on Oct. 15, 2014, 2 pages.
English language abstract for JP2004505134 extracted from espacenet.com database on Oct. 15, 2014, 1 page.
English language abstract and machine-assisted English translation for JPH11167295 extracted from espacenet.com and ipdl.inpit.go.jp databases on Oct. 16, 2014, 11 pages.
English language abstract and machine-assisted English translation for JP2004221071 extracted from espacenet.com and ipdl.inpit.go.jp databases on Oct. 16, 2014, 20 pages.
English language abstract and machine-assisted English translation for CN101942200(A) extracted from http://worldwide.espacenet.com on Dec. 19, 2016, 15 pages.
English language abstract and machine-assisted English translation for JP2007169356(A) extracted from http://worldwide.espacenet.com on Dec. 19, 2016, 16 pages.
Jiang Hong-sheng, Huang Ying, Yang Qing-hua, Gao Feng, Liu Ping, "Temperature coefficient of resistance based on conductive rubber filled by carbon black", Chinese Library classification: TP212, Paper No. 1001-9731 (2012)02-0383-04, pp. 383-386, Journal of Functional Materials vol. (43) No. 3 2012.

* cited by examiner

ROOM TEMPERATURE-CURABLE ELECTRICALLY CONDUCTIVE FLUOROSILICONE RUBBER COMPOSITION

CROSS-REFERENCE TO RELATED APPLICATIONS

This application is the National Stage of International Patent Application No. PCT/JP2013/065128, filed on May 24, 2013, which claims priority to and all advantages of Japanese Patent Application No. 2012-121857, filed on May 29, 2012, the content of which is hereby incorporated by reference.

TECHNICAL FIELD

The present invention relates to a room temperature-curable electrically conductive fluorosilicone rubber composition.

BACKGROUND ART

Silicone rubber cured products are used as rolls and other constituent members used in wet electrophotographic devices. The silicone rubber compositions used need to exhibit superior physical strength and suitable electrical conductivity.

Conventionally, room temperature-curable silicone rubber compositions are known as being suitable for use as sealants, but their use is limited due to problems pertaining to tensile strength, solvent resistance, and the like. In order to overcome such problems, the use of fluorosilicone rubber has been suggested.

For example, Japanese Unexamined Patent Application Publication No. H02-43264 describes a composition comprising a fluorosilicone polymer and a reinforcing silica for the purpose of providing a sealant with improved tensile strength. Japanese Unexamined Patent Application Publication No. H06-262621 and Japanese Unexamined Patent Application Publication (Translation of PCT Application) No. 2004-505134 describe compositions comprising a fluorosilicone capped with silanols for the purpose of improving the solvent resistance and the like of a sealant. However, such compositions do not have electrical conductivity and, thus, lack characteristics that make them useful as anything other than compositions for use as sealants.

In contrast, using fluorosilicone rubber as a member used in a wet electrophotographic device has been suggested. For example, Japanese Unexamined Patent Application Publication Nos. H11-167295 and H07-295403 describe using electrically conductive fluorosilicone rubber as a surface layer on a metal drum of a wet photographic device. However, specific formulations of these fluorosilicone rubbers are not sufficiently recited and the electrical conductivity, and post-cure physical strength, surface smoothness, and other characteristics did not satisfy all of the required performance criteria.

Moreover, Japanese Unexamined Patent Application Publication No. 2004-221071 describes a carbonaceous material for an electrically conductive composition comprising vapor grown carbon fiber having a specific structure and graphite particles and/or amorphous carbon particles, for the purpose of improving electrical conductivity and preventing migration in an electrically conductive coating or electrically conductive adhesive. Furthermore, silicone is recited as the resin component thereof. While this composition has superior electrical conductivity, problems pertaining to physical strength are also exhibited such as post-cure tensile strength and the like.

Thus, conventional room temperature-curable silicone rubber compositions are deficient in that both sufficient electrical conductivity and superior physical strength cannot be obtained in cases when the compositions are used in applications having electrical conductivity. Additionally, in such cases, post-cure surface smoothness, solvent resistance, and adhesion have not been satisfactory.

In light of the problems described above, an object of the present invention is to provide a room temperature-curable electrically conductive fluorosilicone rubber composition by which a cured product having both superior post-cure physical strength and electrical conductivity can be obtained. Another object of the present invention is to provide a room temperature-curable electrically conductive fluorosilicone rubber composition having viscosity that enables superior handling, and superior post-cure surface smoothness, solvent resistance, and adhesion.

DISCLOSURE OF INVENTION

As a result of diligent research aimed at achieving the above objects, the present inventors arrived at the present invention. Specifically, the objects of the present invention are achieved by:

A room temperature-curable electrically conductive fluorosilicone rubber composition comprising:
(A) a fluoropolysiloxane capped at the molecular terminals with hydroxyl groups having a viscosity at 25° C. of from 1,000 to 1,000,000 mPa·s;
(B) a fine silica powder having a BET specific surface area of not less than 50 m²/g;
(C) a carbon black;
(D) a fibrous carbon allotrope having a graphene structure; and
(E) a crosslinking agent;
wherein component (D) is comprised in an amount of not less than 1.5 parts by mass per 100 parts by mass of component (A).

Component (A) is preferably a fluoropolysiloxane represented by:

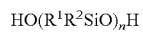

wherein $R^1$ is a monovalent hydrocarbon group having from 1 to 20 carbon atoms, from 50 to 100 mol % of $R^2$ are fluorine-substituted alkyl groups having from 1 to 12 carbon atoms, the remainder of $R^2$ are monovalent hydrocarbon groups having from 0.1 to 20 carbon atoms, and "n" is a value such that the viscosity at 25° C. is from 1,000 to 1,000,000 mPa·s; and "n" is more preferably a value of from 100 to 500.

Component (B) is preferably comprised in an amount of from 6 to 50 parts by mass per 100 parts by mass of component (A).

Component (C) is preferably comprised in an amount of from 1 to 20 parts by mass per 100 parts by mass of component (A).

Component (D) is preferably a carbon nanofiber or a carbon nanotube.

Component (D) is preferably comprised in an amount of not more than 5.0 parts by mass per 100 parts by mass of component (A).

Component (E) is preferably a triketoximosilane or a triacetoxysilane.

Component (E) is preferably comprised in an amount of from 1 to 30 parts by mass per 100 parts by mass of component (A).

The room temperature-curable electrically conductive fluorosilicone rubber composition of the present invention can further comprise: (F) a fluoropolysiloxane capped at the molecular terminals with hydroxyl groups having a viscosity at 25° C. of from 1 to 900 mPa·s.

Component (F) is preferably comprised in an amount of from 0.1 to 50 parts by mass per 100 parts by mass of component (A).

Effects of Invention

According to the present invention, a room temperature-curable electrically conductive fluorosilicone rubber composition having superior post-cure physical strength such as tensile strength and the like, and exhibiting electrical conductivity can be provided.

Additionally, the room temperature-curable electrically conductive fluorosilicone rubber composition of the present invention has superior post-cure surface smoothness, solvent resistance, and adhesion.

DETAILED DESCRIPTION OF THE INVENTION

A room temperature-curable electrically conductive fluorosilicone rubber composition of the present invention comprises:
(A) a fluoropolysiloxane capped at the molecular terminals with hydroxyl groups having a viscosity at 25° C. of from 1,000 to 1,000,000 mPa·s;
(B) a fine silica powder having a BET specific surface area of not less than 50 m$^2$/g;
(C) a carbon black;
(D) a fibrous carbon allotrope having a graphene structure; and
(E) a crosslinking agent;
wherein component (D) is comprised in an amount of not less than 1.5 parts by mass per 100 parts by mass of component (A).

Component (A) is a fluoropolysiloxane capped at the molecular terminals with hydroxyl groups having a viscosity at 25° C. of from 1,000 to 1,000,000 mPa·s, preferably from 5,000 to 500,000 mPa·s, and more preferably from 10,000 to 100,000 mPa·s.

Component (A) of the present invention is not particularly limited, provided that it is a fluoropolysiloxane capped at the molecular terminals with hydroxyl groups having a viscosity at 25° C. of from 1,000 to 1,000,000 mPa·s, but preferably is a fluoropolysiloxane represented by:

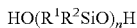

HO(R$^1$R$^2$SiO)$_n$H

In this formula, R$^1$ is a monovalent hydrocarbon group having from 1 to 20 carbon atoms, from 50 to 100 mol % of R$^2$ are fluorine-substituted alkyl groups having from 1 to 12 carbon atoms, the remainder of R$^2$ are monovalent hydrocarbon groups having from 1 to 20 carbon atoms, and "n" is a value such that the viscosity at 25° C. is from 1,000 to 1,000,000 mPa·s.

Examples of the monovalent hydrocarbon group of R$^1$ and R$^2$ include methyl groups, ethyl groups, propyl groups, butyl groups, pentyl groups, hexyl groups, heptyl groups, and similar alkyl groups; vinyl groups, allyl groups, butenyl groups, pentenyl groups, hexenyl groups, and similar alkenyl groups; phenyl groups, tolyl groups, xylyl groups, naphthyl groups, and similar aryl groups; benzyl groups, phenethyl groups, and similar aralkyl groups; chloromethyl groups, 3-chloropropyl groups, 3,3,3-trifluoropropyl groups, nonafluorobutylethyl groups, and similar substituted alkyl groups.

The fluorine-substituted alkyl group of R$^2$ represents an alkyl group wherein one or more hydrogen is substituted by fluorine. Examples of the alkyl group include a methyl group, an ethyl group, a propyl group, a butyl group, a pentyl group, a hexyl group, and a heptyl group. Examples of the fluorine-substituted alkyl group include a 3,3,3-trifluoropropyl group, a pentafluoroethyl group, a nonafluorobutylethyl group, and similar perfluoroalkyl groups.

"n" is a value such that the viscosity at 25° C. is from 1,000 to 1,000,000 mPa·s and preferably is a value of from 100 to 500.

Component (B) of the present invention is a fine silica powder having a BET specific surface area of not less than 50 m$^2$/g, and functions to increase the physical strength of the composition both pre- and post-cure. Examples of the fine silica powder that can be used include dry silicas such as fumed silica, wet silicas and similar synthetic silica, and mixtures thereof. These silicas have a large amount of silanol groups on the surface and, therefore, can be used as what is referred to as "hydrophobic silica" that has been surface treated using, for example, halogenated silanes, alkoxysilanes, various silazane compounds (e.g. hexamethyldisilazane and tetramethyldivinyldisilazane), or a similar silylating agent. Note that in place of the hydrophobic silica, it is also possible to use a master batch obtained by mixing the fluoropolysiloxane of component (A) and the fine silica powder.

The specific surface area of the fine silica powder of component (B) of the present invention, calculated by the BET method, is not less than 50 m$^2$/g, and is preferably from 100 to 300 m$^2$/g. If the specific surface area is less than 50 m$^2$/g, there is a possibility that sufficient strength characteristics will not be imparted to the cured product.

The fine silica powder of component (B) of the present invention is preferably comprised in an amount of from 6 to 50 parts by mass and more preferably from 10 to 20 parts by mass per 100 parts by mass of component (A). In cases where the content of component (B) is within the range described above, sufficient tensile strength can be imparted to the cured product.

Component (C) of the present invention is a carbon black, and functions to impart electrical conductivity to the cured product. Examples of the carbon black include acetylene black, furnace black, ketjen black, gas black, lamp black, thermal black, and channel black. Note that it is also possible to use a master batch obtained by mixing the fluoropolysiloxane of component (A) and the carbon black.

The carbon black of component (C) of the present invention is preferably comprised in an amount of from 1 to 20 parts by mass and more preferably from 5 to 10 parts by mass per 100 parts by mass of component (A). In cases where the content of component (C) is within the range described above, electricity will conduct through the cured product and volume resistivity can be reduced.

Component (D) of the present invention is a fibrous carbon allotrope having a graphene structure, and functions to reduce the volume resistivity of the cured product. The fibrous carbon allotrope having a graphene structure is preferably a carbon nanofiber or a carbon nanotube. The alignment of the graphene layer of the carbon nanofiber is not particularly limited, and examples thereof include plate-like structures, herringbone structures, stacked-cup structures, and ribbon structures. As used herein, "carbon nanotube" refers to a hollow, fibrous carbon material, and encompasses carbon nanohorns which have a conical shape and are closed at one end. The graphene plane of the carbon nanotube may be a single layer or bilayer plane, or may be a multiple-layer plane consisting of three or more layers. Vapor grown carbon fiber is a type of carbon nanotube, and is carbon fiber having a laminate structure formed by layering carbon layer plane crystals in a growth ring manner. Moreover, vapor grown carbon fiber has a hollow interior.

The major diameter of component (D) is preferably from 2 to 1,000 nm and more preferably from 10 to 500 nm. Additionally, length of component (D) is preferably from 10 nm to 100 μm and more preferably from 100 nm to 20 μm. In cases where the major diameter and the length are within the ranges described above, excellent surface smoothness can be obtained.

The fibrous carbon allotrope having a graphene structure of component (D) of the present invention must be comprised in an amount of not less than 1.5 parts by mass and preferably not more than 5.0 parts by mass per 100 parts by mass of component (A). In cases where the content of component (D) is within the range described above, the volume resistivity of the cured product can be reduced and excellent surface smoothness can be obtained.

Component (E) of the present invention is a crosslinking agent for component (A), and has at least two and preferably three or four silicon-bonded hydrolysable groups. Examples thereof include an organosilane represented by the general formula: $R^3{}_aSiX_{4-a}$ (wherein $R^3$ is a monovalent hydrocarbon group having from 1 to 10 carbon atoms, X is a hydrolysable group, and "a" is 0 or 1) and an organosiloxane oligomer, which is a partially hydrolyzed condensate of said organosilane. Examples of the monovalent hydrocarbon group of R include the same groups recited for $R^1$ and $R^2$. Examples of X include dimethylketoximo groups, methylethyl ketoximo groups, and similar ketoximo groups (also called "ketoximino groups", i.e. groups represented by the general formula: —O—N=$CR^4R^5$ (wherein $R^4$ and $R^5$ are identical or different alkyl groups, preferably alkyl groups having from 1 to 6 carbon atoms)); methoxy groups, ethoxy groups, and similar alkoxy groups; acetoxy groups and similar acyloxy groups; N-butylamino groups, N, N-diethylamino groups, and similar alkylamino groups; N-methylacetamide groups and similar acylamide groups; N,N-diethylaminoxy groups and similar N,N-dialkylaminoxy groups; and propenoxy groups and similar alkenyloxy groups. Of these, ketoximo groups and acyloxy groups are preferable.

The crosslinking agent of component (E) is preferably a tetraketoximosilane, a triketoximosilane, a triacetoxysilane, or a mixture thereof. Examples of the triketoximosilane include methyl triketoximosilane and vinyl triketoximosilane. Examples of the triacetoxysilane include methyl triacetoxysilane and ethyl triacetoxysilane.

The crosslinking agent of component (E) of the present invention is preferably comprised in an amount of from 1 to 30 parts by mass per 100 parts by mass of component (A). In cases where the content of component (E) is within the range described above, the composition can be thoroughly cured and superior adhesion can be obtained.

The room temperature-curable electrically conductive fluorosilicone rubber composition of the present invention can further comprise: (F) a fluoropolysiloxane capped at the molecular terminals with hydroxyl groups having a viscosity at 25° C. of from 1 to 900 mPa·s.

The fluoropolysiloxane capped at the molecular terminals with hydroxyl groups of component (F) having a viscosity at 25° C. of from 1 to 900 mPa·s of the present invention is preferably comprised in an amount of from 0.1 to 50 parts by mass per 100 parts by mass of component (A).

Provided that the objects of the present invention are not inhibited, the room temperature-curable electrically conductive fluorosilicone rubber composition of the present invention may comprise the following various additives as optional components: fumed titanium oxide and similar reinforcing fillers; diatomaceous earth, aluminosilicate, iron oxide, zinc oxide, calcium carbonate, and similar non-reinforcing fillers; aluminum oxide, silver powder, and similar thermally conductive fillers; and surface-treated products of these fillers, treated using an organosilane, a polyorganosiloxane, or a similar organosilicon compound. Additionally, as necessary, methyl ethyl ketone, methyl isobutyl ketone, or a similar solvent, a pigment, a dye, a heat-resistant agent, a flame retardant, an internal release agent, a plasticizer, a mineral oil, a nonfunctional silicone oil, or similar additive commonly used in silicone elastomer compositions may be compounded.

The room temperature-curable electrically conductive fluorosilicone rubber composition of the present invention can be easily produced by uniformly mixing a composition comprising components (A) to (E), and preferably components (A) to (E) and (F) and, as necessary, the various additives described above using a known mixing means. The mixing means are not particularly limited provided that at least components (A) to (E) can be uniformly mixed. Examples thereof include a homomixer, a paddle mixer, a homo-disper, a colloid mill, a vacuum stirring mixer, and a planetary mixer. Preferably, a silica master batch in which a portion of component (A) and the fine silica powder (B) are compounded or a carbon master batch in which a portion of component (A) and the carbon black (C) are compounded is prepared in advance and, thereafter, this master batch and the remainder of component (A) and the other components are mixed.

The room temperature-curable electrically conductive fluorosilicone rubber composition of the present invention may be a one-part type curing composition or a two-parts type curing composition, but from the perspective of ease of workability, is preferably a one-part type curing composition. In cases where the adhesive of the present invention is a one-part type curing composition, the room temperature-curable electrically conductive fluorosilicone rubber composition of the present invention is encapsulated and stored in a sealed cartridge or similar container. When using the composition, the composition is removed from the container and exposed to air. Thereby, the single-component curing room temperature-curable electrically conductive fluorosilicone rubber composition of the present invention cures due to the moisture present in the air and becomes a silicone rubber having rubber elasticity.

A cured product of the room temperature-curable electrically conductive fluorosilicone rubber composition of the present invention preferably has a tensile strength and elongation at breaking (measured in accordance with JIS K 6251) of, respectively, not less than 2.0 MPa and not less than 200%. In cases where the tensile strength and the elongation of the cured product of the room temperature-curable electrically conductive fluorosilicone rubber composition are within these ranges, the cured product will have sufficient flexibility and strength even when a thin film or the like.

The cured product of the room temperature-curable electrically conductive fluorosilicone rubber composition of the present invention preferably has a volume resistivity when 5 V are applied of from $1\times10^2$ to $1\times10^{12}$ Ω·cm and more preferably of from $1\times10^5$ to $1\times10^{11}$ Ω·cm.

The cured product of the room temperature-curable electrically conductive fluorosilicone rubber composition of the present invention can be suitably used as a roll, belt, or other constituent member of an intermediate transfer body or the like for use in a wet electrophotographic device.

EXAMPLES

Hereinafter, examples will be used to describe the present invention in more detail, but the present invention is not limited to these examples. In the examples, the content of the components referred to as "parts" means "parts by mass."

Preparation of the room temperature-curable electrically conductive fluorosilicone rubber composition Preparation of the Silica Master Batch 100 parts of a trifluoropropylmethylpolysiloxane capped at both molecular terminals with hydroxyl groups, having a viscosity at 25° C. of about 60 Pa·s were added to a planetary mixer. Next, 40 parts of fumed silica treated using hexamethyldisilazane (Aerosil RDX200, manufactured by Nippon Aerosil Co., Ltd.; BET method specific surface area: 200 m²/g) was added in ten portions, stirring after each addition. Next, tank pressure was reduced to less than or equal to 1333 Pa, and the mixture was stirred for 90 minutes while heating at 175° C. Thereafter, the mixture was cooled by mixing for 60 minutes while maintaining the level of reduced pressure. Then, the stirring was stopped and the pressure was returned to normal while purging the tank with nitrogen. Thus, a silica master batch was produced.

[Preparation of Carbon Master Batch-1]

100 parts of a trifluoropropylmethylpolysiloxane capped at both molecular terminals with hydroxyl groups, having a viscosity at 25° C. of about 60 Pa·s and 12 parts of a carbon black (Denka Black®, manufactured by Denki Kagaku Kogyo K.K.) were added to a planetary mixer and stirred under normal pressure at ambient temperature. Next, the obtained mixture was placed in a three-roll mill and subjected to five passes. Thus, a carbon master batch in which the carbon black was uniformly dispersed was produced. The dispersibility of the carbon was measured in accordance with JIS K5400 using a grindmeter. Measurements of 1 μm or greater were considered failing.

[Preparation of Carbon Master Batch-2]

Aside from adjusting the number of parts of the carbon black (Denka Black®, manufactured by Denki Kagaku Kogyo K.K.) to 17 parts, the carbon master batch-2 was produced in the same manner as the carbon master batch-1.

Practical Example 1

24.2 parts of a trifluoropropylmethylpolysiloxane capped at both molecular terminals with hydroxyl groups, having a viscosity at 25° C. of about 60 Pa·s, 51.3 parts of the carbon master batch-1, 42 parts of the silica master batch, 2.0 parts of multi-walled carbon nanotubes having a diameter of 150 nm and a length of about 8 μm (vapor grown carbon fiber), and 6.0 parts of trifluoropropylmethylsiloxane capped at both molecular terminals with hydroxyl groups, having a viscosity at 25° C. of about 10 mPa·s were placed in a 250 cc capacity plastic bottle. This mixture was placed in an AR-250 super mixer (manufactured by Thinky, Co., Ltd.) and mixed in agitation mode for two minutes. After scraping the bottom and inner surfaces of the mixer, mixing was performed again for two minutes under the same conditions. Thus a base was produced. 125.5 parts of the base was placed into a 325 mL cartridge having a mix head (manufactured by Techcon Systems, Inc.) that was set beforehand. The air was then forced out of the cartridge by centrifugation and, thereafter the base was allowed to sit at rest overnight in the vacuum drawn chamber at a temperature of 23±2° C. and a relative humidity of 55±5%.

The viscosity of the base was measured at 25° C. using an AR-500 rheometer (manufactured by TA Instruments), set to continuous ramp step mode. Apparent viscosity where the shear rate was 10 (1/s), was recorded as the viscosity. Results are shown in Table 1.

14.7 parts of a ketoximosilane (OS-4015, manufactured by Honeywell; mixture of tetrakis(methylethylketoximo)silane and vinyl tris(methylethylketoximo)silane) per 125.5 parts of the base were placed in an 8 inch ram rod and then the cartridge described above was attached. Thus, a package kit was fabricated. The package kit was then attached to a TECHKIT MIXER TS6500 (manufactured by Techcon Systems, Inc.) and the base and an oximesilane were mixed for five minutes under sealed conditions. Following the mixing, the ram rod was removed, a nozzle was attached in its place, and the container was set in a sealant/caulking gun. The composition was dispensed so as to form a 2 mm thick sheet, and was allowed to cure at a temperature of 23±2° C. and a relative humidity of 55±5% for two weeks. Then the rubber physical properties were measured in accordance with JIS K 6249 and the results thereof were recorded in Table 2.

Practical Example 2 and Comparative Examples 1 to 6

Aside from using the formulation of Table 1 to prepare the composition, preparation was carried out in the same manner as in Practical Example 1, and the viscosity and rubber physical properties were evaluated. The results are shown in Tables 1 and 2. Note that the term "post-development formulation" in Table 1 refers to a formulation in a case where the components comprised in the silica master batch and the carbon master batch are, respectively, the trifluoropropylmethylpolysiloxane capped at both molecular terminals with hydroxyl groups and fumed silica, and the trifluoropropylmethylpolysiloxane capped at both molecular terminals with hydroxyl groups and the carbon black.

TABLE 1

|  |  | Practical Example 1 | Practical Example 2 | Comparative Example 1 | Comparative Example 2 | Comparative Example 3 | Comparative Example 4 | Comparative Example 5 | Comparative Example 6 |
| --- | --- | --- | --- | --- | --- | --- | --- | --- | --- |
| Trifluoropropylmethylpolysiloxane capped at both molecular terminals with hydroxyl groups | Parts | 24.2 | 24.2 | 24.2 | 44.2 | 40.0 | 20.0 | 24.2 | 24.2 |

TABLE 1-continued

|  |  | Practical Example 1 | Practical Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| Carbon master batch-1 | Parts | 51.3 | 51.3 | 51.3 | 51.3 | — | — | 51.3 | 51.3 |
| Carbon master batch-2 | Parts | — | — | — | — | 58.5 | 58.5 | — | — |
| Silica master batch | Parts | 42.0 | 42.0 | 42.0 | 14.0 | 14.0 | 42.0 | 42.0 | 42.0 |
| Multi-walled carbon nanotubes (D: 150 nm, L: 8 μm) | Parts | 2.0 | 4.0 | — | — | — | — | 1.0 | 6.0 |
| Trifluoropropylmethyl-siloxane oligomer capped at both molecular terminals with hydroxyl groups | Parts | 6.0 | 6.0 | 6.0 | 7.8 | 6.0 | 6.0 | 6.0 | 6.0 |
| Oximesilane | Parts | 14.7 | 14.7 | 14.7 | 18.4 | 14.7 | 14.7 | 14.7 | 14.7 |
| Total | Parts | 140.2 | 142.2 | 138.2 | 135.7 | 133.2 | 141.2 | 139.2 | 144.2 |
| Post-development formulation | | | | | | | | | |
| Trifluoropropylmethylpolysiloxane capped at both molecular terminals with hydroxyl groups | Parts | 100.0 | 100.0 | 100.0 | 100.0 | 100.0 | 100.0 | 100.0 | 100.0 |
| Fumed silica | Parts | 12.0 | 12.0 | 12.0 | 4.0 | 4.0 | 12.0 | 12.0 | 12.0 |
| Carbon black | Parts | 5.5 | 5.5 | 5.5 | 5.5 | 8.5 | 8.5 | 5.5 | 5.5 |
| Vapor grown carbon fiber (D: 150 nm, L: 8 μm) | Parts | 2.0 | 4.0 | — | — | — | — | 1.0 | 6.0 |
| Trifluoropropylmethylsiloxane oligomer capped at both molecular terminals with hydroxyl groups | Parts | 6.0 | 6.0 | 6.0 | 7.8 | 6.0 | 6.0 | 6.0 | 6.0 |
| Oximesilane | Parts | 14.7 | 14.7 | 14.7 | 18.4 | 14.7 | 14.7 | 14.7 | 14.7 |
| Total | Parts | 140.2 | 142.2 | 138.2 | 135.7 | 133.2 | 141.2 | 139.2 | 144.2 |
| Base viscosity (value read when shear rate at 10 (1/s)) | Pa·s | 414 | 564 | 293 | 135 | 196 | 437 | 373 | 694 |

[Evaluation Method for Cured Product]

(1) Tack-Free Time

Uncured sample material was placed on a Teflon® sheet so as to be flat and the rubber surface was touched with a fingertip that had been cleansed using ethyl alcohol. The same action was repeated over time at different sites and the time elapsed until the fingertip ceased to stick to the sample material was measured.

(2) Hardness

Hardness was measured using a type-A durometer stipulated by JIS K6253.

(3) Tensile Strength and Elongation

Tensile strength and elongation at breaking were measured in accordance with the methods stipulated in JIS K6251.

(4) Volume Resistivity

A rubber sheet having a thickness of 2 mm was placed on a metal plate made from SUS304, and a cylindrical electrode made from SUS304, having a diameter of 50 mm, was placed on the rubber sheet. Volume resistivity when the metal plate and the electrode were connected to a HiTester 3222 (manufactured by Hioki E.E. Corporation) and 5 V of electricity was applied was measured. The volume resistivity was read one minute after placing the electrode on the rubber sheet. This test was repeated five times and the average thereof was recorded in Table 2.

(5) Adhesion to Acrylonitrile-Butadiene Rubber (NBR) and Solvent Resistance

The room temperature-curable fluorosilicone rubber composition was coated so as to cover a sponge made from NBR and cured for two weeks at a temperature of 23±2° C. and a relative humidity of 55±5%. Then, the sample was immersed in an isoparaffin solvent (Isopar™ G, manufactured by Exxon Mobil Corporation). One week after the start of the immersion, the degree of bulging was evaluated and adhesion with the NBR was evaluated both visually and by peeling the coating off using a fingernail. The degree of bulging was evaluated based on dimension variation in the length direction of the coating layer. Samples for which the degree of bulging was not more than 5% and no cracking or peeling of the coating layer were found were evaluated as "good."

(6) Surface Smoothness 100 parts of the room temperature-curable fluorosilicone rubber composition was uniformly dissolved in 100 parts of methyl isobutyl ketone (MIBK). Then, the mixture was coated on a Teflon® sheet and left at rest for one day at room temperature in a fume hood. Thus, the MIBK was vaporized. Next, the composition was cured for two weeks at a temperature of 23±2° C. and a relative humidity of 55±5%. Surface observation was then carried out using a KH-7700 digital microscope (manufactured by Hirox Co., Ltd). The number of convexities in a 1000 μm×600 μm area were counted. Surface smoothness was evaluated to be "poor" in cases where 10 or more, "fine" in cases where 5 or more, and "good" in cases where less than 5 convexities having a height of 10 μm or greater were found.

TABLE 2

|  |  | Practical Example 1 | Practical Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| Tack-free time | Min:Sec | 10:33 | 10:01 | 09:33 | 14:05 | 11:02 | 09:53 | 11:04 | 10:25 |
| Hardness (JIS type-A) | — | 41 | 44 | 37 | 29 | 27 | 43 | 37 | 47 |
| Tensile strength (No. 3) | MPa | 2.6 | 2.5 | 2.6 | 1.1 | 1.7 | 2.6 | 2.5 | 2.9 |
| Elongation (No. 3) | % | 290 | 270 | 280 | 240 | 290 | 280 | 330 | 300 |
| Volume resistivity | $\Omega \cdot cm$ | $6.1 \times 10^9$ | $5.3 \times 10^5$ | Did not conduct | $1.3 \times 10^6$ | $6.7 \times 10^4$ | Did not conduct | Did not conduct | $5.4 \times 10^3$ |
| Adhesion | — | Good | Good | Good | Good | Good | Good | Good | Good |
| Solvent resistance | — | Good | Good | Good | Good | Good | Good | Good | Good |
| Surface smoothness | — | Good | Good | Good | Good | Good | Good | Good | Fine |

As clear from Table 2, in cases where the room temperature-curable electrically conductive fluorosilicone rubber compositions of Practical Examples 1 and 2 were cured, a cured product having suitable volume resistivity, and excellent hardness, tensile strength, adhesion, solvent resistance, and surface smoothness was obtained. In Comparative Examples 1 and 4, where the vapor grown carbon fiber was not included and Comparative Example 5, where the compounded amount of the vapor grown carbon fiber was small, the cured products of the room temperature-curable fluorosilicone rubber compositions did not exhibit electrical conductivity. Additionally, in Comparative Examples 2 and 3, where the compounded amount of the silica was small, the cured products of the room temperature-curable fluorosilicone rubber compositions exhibited low tensile strength and inferior physical strength. Furthermore, in Comparative Example 6, where the compounded amount of the vapor grown carbon fiber was great, the cured product of the room temperature-curable fluorosilicone rubber composition exhibited inferior surface smoothness.

The invention claimed is:

1. A room temperature-curable electrically conductive fluorosilicone rubber composition comprising:
   (A) a fluoropolysiloxane capped at the molecular terminals with hydroxyl groups having a viscosity at 25° C. of from 1,000 to 1,000,000 mPa·s;
   (B) a fine silica powder having a BET specific surface area of not less than 50 m²/g;
   (C) a carbon black;
   (D) a fibrous carbon allotrope having a graphene structure; and
   (E) a crosslinking agent;
   wherein component (D) is comprised in an amount of not less than 1.5 parts by mass per 100 parts by mass of component (A); and
   wherein component (D) is a carbon nanofiber or a carbon nanotube.

2. The room temperature-curable electrically conductive fluorosilicone rubber composition according to claim 1, wherein component (A) is a fluoropolysiloxane represented by:

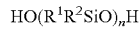

wherein $R^1$ is a monovalent hydrocarbon group having from 1 to 20 carbon atoms, from 50 to 100 mol % of $R^2$ are fluorine-substituted alkyl groups having from 1 to 12 carbon atoms, the remainder of $R^2$ are monovalent hydrocarbon groups having from 1 to 20 carbon atoms, and "n" is a value such that the viscosity at 25° C. is from 1,000 to 1,000,000 mPa·s.

3. The room temperature-curable electrically conductive fluorosilicone rubber composition according to claim 2, wherein "n" is a value from 100 to 500.

4. The room temperature-curable electrically conductive fluorosilicone rubber composition according to claim 2, wherein component (B) is comprised in an amount of from 6 to 50 parts by mass per 100 parts by mass of component (A).

5. The room temperature-curable electrically conductive fluorosilicone rubber composition according to claim 4, wherein component (C) is comprised in an amount of from 1 to 20 parts by mass per 100 parts by mass of component (A).

6. The room temperature-curable electrically conductive fluorosilicone rubber composition according to claim 5, wherein:
   i) component (D) is a carbon nanotube;
   ii) component (D) is comprised in an amount of not more than 5.0 parts by mass per 100 parts by mass of component (A); or
   iii) both i) and ii).

7. The room temperature-curable electrically conductive fluorosilicone rubber composition according to claim 6, wherein:
   i) component (E) is a triketoximosilane or a triacetoxysilane;
   ii) component (E) is comprised in an amount of from 1 to 30 parts by mass per 100 parts by mass of component (A); or
   iii) both i) and ii).

8. The room temperature-curable electrically conductive fluorosilicone rubber composition according to claim 7, further comprising: (F) a fluoropolysiloxane capped at the molecular terminals with hydroxyl groups having a viscosity at 25° C. of from 1 to 900 mPa·s.

9. The room temperature-curable electrically conductive fluorosilicone rubber composition according to claim 8, wherein component (F) is comprised in an amount of from 0.1 to 50 parts by mass per 100 parts by mass of component (A).

10. The room temperature-curable electrically conductive fluorosilicone rubber composition according to claim 1, wherein component (B) is comprised in an amount of from 6 to 50 parts by mass per 100 parts by mass of component (A).

11. The room temperature-curable electrically conductive fluorosilicone rubber composition according to claim 1, wherein component (C) is comprised in an amount of from 1 to 20 parts by mass per 100 parts by mass of component (A).

12. The room temperature-curable electrically conductive fluorosilicone rubber composition according to claim 1, wherein component (D) is a carbon nanotube.

13. The room temperature-curable electrically conductive fluorosilicone rubber composition according to claim 12, wherein component (D) is comprised in an amount of not more than 5.0 parts by mass per 100 parts by mass of component (A).

14. The room temperature-curable electrically conductive fluorosilicone rubber composition according to claim 1, wherein component (D) is comprised in an amount of not more than 5.0 parts by mass per 100 parts by mass of component (A).

15. The room temperature-curable electrically conductive fluorosilicone rubber composition according to claim 1, wherein component (E) is a triketoximosilane or a triacetoxysilane.

16. The room temperature-curable electrically conductive fluorosilicone rubber composition according to claim 15, wherein component (E) is comprised in an amount of from 1 to 30 parts by mass per 100 parts by mass of component (A).

17. The room temperature-curable electrically conductive fluorosilicone rubber composition according to claim 1, wherein component (E) is comprised in an amount of from 1 to 30 parts by mass per 100 parts by mass of component (A).

18. The room temperature-curable electrically conductive fluorosilicone rubber composition according to claim 1, further comprising: (F) a fluoropolysiloxane capped at the molecular terminals with hydroxyl groups having a viscosity at 25° C. of from 1 to 900 mPa·s.

19. The room temperature-curable electrically conductive fluorosilicone rubber composition according to claim 18, wherein component (F) is comprised in an amount of from 0.1 to 50 parts by mass per 100 parts by mass of component (A).

20. A cured product of the room temperature-curable electrically conductive fluorosilicone rubber composition according to claim 1, said cured product having:
   i) a tensile strength of not less than 2.0 MPa in accordance with JIS K 6251;
   ii) an elongation at break of not less than 200% in accordance with JIS K 6251;
   iii) a volume resistivity of from $1 \times 10^2$ to $1 \times 10^{12}$ Ω·cm when 5 V are applied; or
   iv) combinations thereof.

* * * * *